United States Patent Office 3,487,768
Patented Jan. 6, 1970

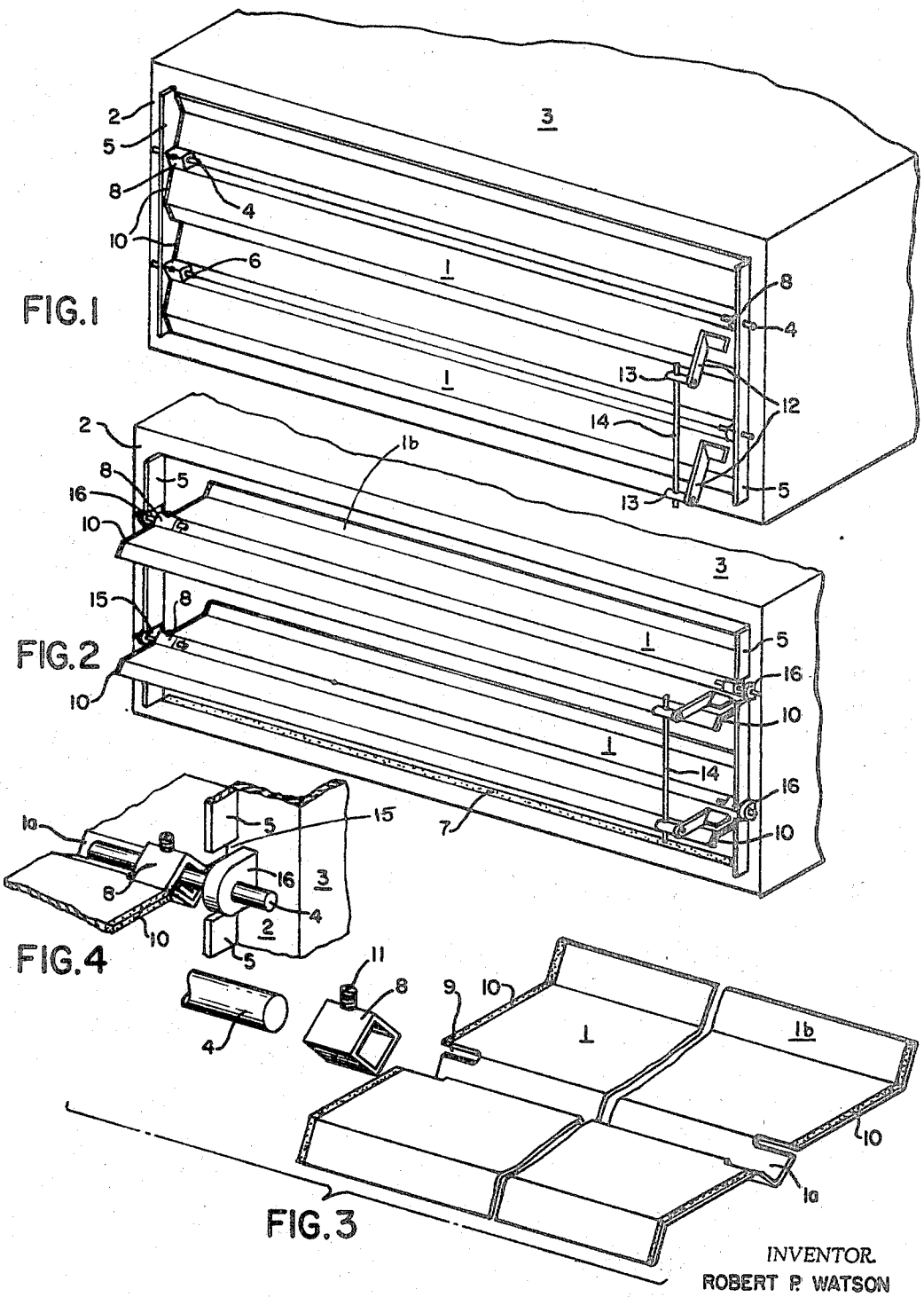

3,487,768
DAMPER FASTENING ARRANGEMENT
Robert P. Watson, Brownsville, Tenn., assignor to American Air Filter Company, Inc., Louisville, Ky., a corporation of Delaware
Filed Mar. 20, 1968, Ser. No. 714,728
Int. Cl. F24f 13/14
U.S. Cl. 98—107                                         3 Claims

ABSTRACT OF THE DISCLOSURE

A damper fastening arrangement to adjustably and releasably secure an air damper blade to a damper shaft which includes a tubular collar adapted to receive the damper shaft and be received by cooperative notches provided at an edge of the damper blade. The tubular clip can include means to tighten the damper blade against the damper shaft so the blade is retained in a selected position relative to the shaft.

Background of the invention

Adjustable air flow dampers are commonly provided to selectively regulate flow of air through conduits or other air flow apparatus. Some such damper arrangements include damper frame means with one or more longitudinally extending damper blades pivotably mounted therein and connected to damper operating shaft means so the damper blades can be rotatably positioned to regulate air flow through the associated conduit. In many previous damper arrangements the damper has been rigidly fixed to the damper shaft and cannot be moved longitudinally along the damper shaft or selectively postioned relative to the circumference of the shaft. In some such applications the rigid attachment does not adversely affect operation of the damper but in other applications, for example where multiple dampers are provided so an air flow restricting seal is formed when adjacent dampers abut each other, it is necessary to provide means to adjust the relative position of the damper blade with respect to the circumference of the shaft and likewise provide means to selectively position the damper longitudinally along the shaft.

Furthermore, in certain applications it is desirable to provide a damper fastening arrangement to permit release of the damper without removing the shaft from the frame or otherwise disassembling the apparatus.

While some previous damper arrangements have provided means to adjust the damper blade with respect to its longitudinal and circumferential position on the damper shaft, such arrangements have not provided means to release the damper blade without first removing at least a part of the shaft or the damper fastener or some other part of the apparatus. In previous devices where the fastener is removed from the damper to release the blade from the shaft it is difficult to reposition the damper when the apparatus is reassembled and, furthermore, the damper fastener is frequently lost when the damper is removed from its mounting. Moreover, in apparatus where it is necessary to remove the damper shaft or other part of the apparataus to release the damper blade considerable labor is required and maintenance expense incurred in servicing such apparatus is significant.

Summary of the invention

The present invention recognizes and provides means to secure a damper blade to a damper shaft so the blade can be easily released from the shaft. Furthermore, the present invention recognizes that the damper blade can be adjustably positioned relative to the circumference of the shaft which carries the blade and relative to the longitudinal axis of the shaft to adjust closure. Moreover, the present invention recognizes and provides an advantageous arrangement whereby the damper blade can be removed from the damper shaft without removing the fastener means from the shaft so the damper fastener is not easily lost and the time and labor required for release and repositioning of the damper blade is significantly reduced.

Various other features of the present invention will become obvious to those skilled in the art upon reading the disclosure set forth hereinafter.

More particularly, the present invention provides a damper arrangement including: a damper blade having cooperative slot means adjacent opposite edges of the blade; tubular collar means having opposite edges to be received by the slot means; shaft means to be slidably received by the collar means; and, means to releasably tighten the collar means to secure the damper blade and damper shaft in selected orientation.

It is to be understood that the example of the present invention which follows is not by way of limitation and that various changes can be made in the arrangement, form, or configuration of the apparatus disclosed without departing from the scope or spirit of the present invention.

Referring now to the drawings:

FIGURE 1 is an example of an air flow conduit with damper fastening means in accordance with the present invention;

FIGURE 2 shows a segment of another embodiment of a damper fastener arrangement in accordance with the present invention;

FIGURE 3 is an exploded view of a damper fastening arrangement provided by one example of the present invention; and, FIGURE 4 is an enlarged view of a portion of a damper fastening arrangement in accordance with the present invention as shown in FIGURE 2.

A damper fastening arrangement in accordance with the present invention can be used with dampers of various configurations, for example longitudinal extending dampers as shown in FIGURES 1 and 2, where multiple dampers are used to close off air flow through a conduit 3.

In the example of the figures, each damper 1 is disposed within a frame 2 and extends completely across conduit 3. In FIGURE 1 the dampers are shown in closed position to block off air flow while in FIGURE 2 the dampers are shown in fully open position to permit maximum air flow through conduit 3. Dampers 1 are mounted for rotation on damper shafts 4 and 6 respectively and it is understood that the dampers can be selectively positioned between the fully open and fully closed positions as shown in FIGURES 1 and 2 to modulate air flow through the conduit. A sealing flange 5 extends outwardly from the opposite edges of frame 2, as shown, and can be disposed to contact edges of blades 1. Shafts 4 and 6 of the example of FIGURE 1 are rotatably journalled in sealing flange means 5 of frame 2 and it will be noted that the dampers are interconnected by linkage arm 14 hereinafter described for synchronous movement. For example, if shaft 4 of the upper damper shown in FIGURES 1 and 2 is used as the drive shaft to be rotated so the upper damper will be moved then the lower damper 1 will likewise rotate on stub shaft 6 in response to rotation of shaft 4. Furthermore, it will be understood that shaft 4 can extend the entire length of damper 1 so the torque exerted to move the upper damper is carried by shaft 4 whereas when a stub shaft is provided a part of the torque is carried by the damper blade itself.

Each damper blade 1 can include a channel 1a extending substantially the length of the damper blade to provide structural stability and, advantageously, the groove can be adapted to receive damper shaft 4 and 6. The damper blades likewise include outwardly directed sealing edges 1b where, as shown in the example of FIGURE 1, the dampers can be positioned within frame 2 of conduit 3 so that edges 1b of adjacent dampers close to interlocking, air flow sealing, relationship. Each damper can be positioned within frame 2 so the opposite edges 10 are in abutting, air flow sealing relationship with sealing flanges 5. As shown, each edge 10 can be adapted to receive a gasket material, for example a molded rubber channel. As shown in FIGURE 2, seal means 7, for example a rubber gasket, can be provided along the edge of frame 2 to provide an air blocking seal between the edge 1b of the outermost dampers and frame member 2.

The damper fastening arrangement in accordance with the present invention as shown in FIGURE 3 provides a tubular collar member 8 adapted to be received by cooperatively located slot means 9 in the edges of each damper blade 1. As shown in FIGURE 3 slots 9 can be disposed on opposite sides of channel 1a so damper shaft 4, is received by channel 1a of damper 1 and collar 8 slips over grooved portion 1a. A threaded opening can be provided in collar 8 to receive a set screw 11 to draw shaft 4 securely against damper 1 when the damper has been positioned in the selected orientation relative to the damper shafts and frame 2.

Collar member 8 can be cut from square tubing which conforms to the 90° channel of the damper blade to facilitate holding the damper blade and the damper shaft in the selected orientation and since collar 8 completely surrounds the portion of the groove 1a between grooves 9 the blade is not deformed as a result of the force exerted when collar 8 is drawn tight.

As shown in FIGURE 1, and hereinbefore discussed, a damper linkage can be provided so the dampers move synchronously. The linkage arrangement shown in FIGURE 1 includes brackets 12 fastened to adjacent dampers and each bracket includes a pivotable member 13. The brackets of adjacent dampers are connected by a link rod 14, as shown, so movement of one damper shaft, for example shaft 4, moves the corresponding damper and by means of link rod 14 the other is moved in selected direction.

In one advantageous arrangement in accordance with the present invention as shown in FIGURES 3 and 4 flanges 5 of frame 2 include notches 15 located so shafts 4 and 6 extend through the notches. The ends of the damper shafts are journalled in bearing means 16 fastened to frame 2 and located, as hereinafter described, a selected distance from the end of the damper blades so space is provided for collar 8 to be received on the damper shaft between the ends of dampers 1 and bearings 16.

As best illustrated in the exploded view of FIGURE 3 the damper arrangement is assembled by inserting tubular coupling 8 on the damper shaft, for example shaft 4, and the damper 1 is then positioned so the shaft is received by channel 1a of damper 1. Collar 8 is inserted in slots 9 of damper 1 so the portions of groove 1a between slots 9 is received by collar 8 and the damper is then finally positiond within frame 2 in the desired orientation. After the damper has been positioned set screw 11 can be tightened to secure shaft 4 against damper 1 to hold dampers 1 in the selected orientation relative to the frame.

It has been recognized that the collar and set screw adjustment allows within geometrical limitations adjustment of the blade relative to the circumference of the shaft and the longitudinal axis of the shaft. Likewise, readjustment of the blade can be made while the apparatus is assembled without removing any part of the assembly.

It will be further noted that in the arrangement provided by the example of FIGURE 2 collars 8 of each damper blade can be easily released from the ends of dampers 1 and moved along the damper shaft through notches 15 so the damper is released from shaft without removing other parts of the assembly. The damper blade is then easily replaced with very little effort and it has been recognized that such an arrangement is particularly useful when a continuous damper shaft is used and it is periodically desirable to remove the damper blade.

The invention claimed is:

1. Damper arrangement including: A damper blade having selectively spaced pairs of cooperative slot means adjacent in aligned relation on opposite edges of said blade; tubular collar means having a selected diameter so opposite sides of said collar are releasably received by said slot means and the portion of said damper blade between said slot means is received by said collar means; shaft means received by said collar means; and means to releasably tighten said collar means to secure the portion of the damper blade received within said collar to said damper shaft and to hold said damper blade and shaft in selected orientation.

2. The apparatus of claim 1 wherein said damper blade includes groove means formed between said pairs of slot means and received by said collar means so said grooved portion of said damper blade and said shaft means are secured together by said collar means.

3. The apparatus of claim 1 including bearing means to receive said shaft means for rotation therein wherein said bearing means are disposed a selected distance from the edge of said damper blade so said collar means can be moved outwardly from blade means along said shaft means to be completely removed from said damper blade.

References Cited

UNITED STATES PATENTS 3,346,013   10/1967   Reichow _____ 98—110 XR

MEYER PERLIN, Primary Examiner

U.S. Cl. X.R.

98—110; 49—74